United States Patent [19]

Tokuhara

[11] 4,263,613
[45] Apr. 21, 1981

[54] TELEVISION CAMERA

[75] Inventor: Mitsuhiro Tokuhara, Chigasaki, Japan

[73] Assignee: Canon Kabushiki Kaisha, Tokyo, Japan

[21] Appl. No.: 54,607

[22] Filed: Jul. 3, 1979

[30] Foreign Application Priority Data

Jul. 6, 1978 [JP] Japan .................................. 53-82278

[51] Int. Cl.³ .............................................. H04N 9/04
[52] U.S. Cl. ....................................................... 358/55
[58] Field of Search ............................ 358/50, 52, 55; 350/173

[56] References Cited

U.S. PATENT DOCUMENTS

3,922,069  11/1975  Kishikawa et al. ..................... 358/55

*Primary Examiner*—Richard Murray
*Attorney, Agent, or Firm*—Fitzpatrick, Cella, Harper & Scinto

[57] ABSTRACT

A color television camera utilizing a compact color separation optical system including three prisms wherein a first prism counted from the objective lens side has an entrance face, a junction face and an exit face, a second prism has a first prism junction face, a third prism junction face and an exit face, and a third prism has a junction face and an exit face. The junction face of the first prism is adhered to the first prism junction face of the second prism through a first dichroic mirror while the third prism junction face of the second prism being adhered to the junction face of the third prism through a second dichroic mirror, whereby the light reflected by the first dichroic mirror is directly guided through the exit face of the first prism to a solid-state image pick-up element while the light reflected by the second dichroic mirror is directly guided through the exit face of the second prism to another solid-state image pick-up element and the light transmitted by the second dichroic mirror is directly guided through said exit face of the third prism to still another solid-state image pick-up element, wherein said first and second dichroic mirrors are oblique to the optical axis of the objective lens.

3 Claims, 1 Drawing Figure

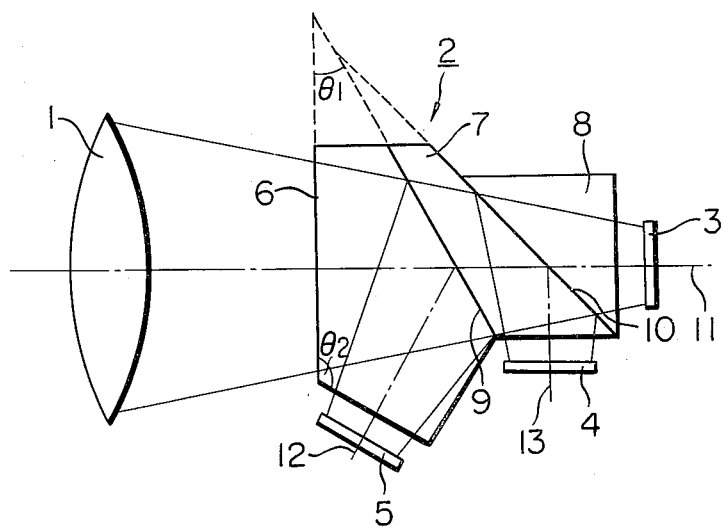

TELEVISION CAMERA

BACKGROUND OF THE INVENTION

1. Field of the Invention

The present invention relates to a television camera, particularly utilizing solid-state image pick-up elements such as charge-coupled devices, and more particularly a television camera provided with color separation prisms adapted for use in combination with such solid-state image pick-up elements.

2. Description of the Prior Art

There are already proposed various television cameras utilizing color separation prisms. Such known color separation prisms, however, are designed for use in combination with image pick-up tubes and are therefore insufficient in their dimensions.

SUMMARY OF THE INVENTION

In consideration of the foregoing, the object of the present invention is to provide a television camera provided with color separation prisms adapted for use in combination with the solid-state image pick-up elements.

BRIEF DESCRIPTION OF THE DRAWINGS

The attached drawing is a view of the optical arrangement of the television camera of the present invention.

DETAILED DESCRIPTION OF THE PREFERRED EMBODIMENTS

The present invention will be explained in detail by an embodiment thereof shown in the attached drawing, wherein there are shown an objective lens 1, color separation prisms 2, composed of first, second and third prisms 6, 7, 8 arranged in this order from said objective lens 1, solid-state image pick-up elements 3, 4 and 5, a first blue- or green-reflecting dichroic layer 9 provided between the junction face of said first prism 7 and the entrance face of said second prism 8, and a second red- or blue-reflecting dichroic layer 10 provided between the junction face of said second prism 7 and the entrance face of said third prism 8, wherein said first dichroic layer 9 is designed to reflect the blue or green component of the light emergent from said objective lens 1 and positioned at such an angle that the thus reflected light is transmitted directly through the exit face without additional reflection by other faces to form a monochroic blue or green image on the solid-state image pick-up element 5, while said second dichroic layer 10 is designed to reflect the red or blue component of the light transmitted by said first dichroic layer 10 and positioned at such an angle that the thus reflected light is directly transmitted through the exit face to form a monochroic red or blue image on the solid-state image pick-up element 4.

The green or red light transmitted by said second dichroic layer 10 proceeds along the optical axis 11 of the objective lens and, upon passing through the exit face, forms a monochroic green or red image on the solid-state image pick-up element 3.

The entrance face of the first prism and the exit face of the third prism are positioned perpendicularly to the optical axis 11 of the objective lens 1, while the exit face of the first prism is perpendicular to a first reflected optical axis 12 of the light diverted toward the first face of the first prism by means of said first dichroic layer 9, and the exit face of the second prism is perpendicular to a second reflected optical axis 13 of the light diverted downwards by the second dichroic layer 10. Said first and second dichroic layers 9, 10 are slanted in a same direction with respect to the non-reflected optical axis 11, whereby it is rendered possible to reduce the longitudinal length of the color separation prisms 2 along said non-reflected optical axis. Further, the angle $\theta_1$ of the first prism between the entrance and junction faces thereof can be defined by $0 < \theta_1 < 35°$, while the angle $\theta_2$ of the first prism between the entrance and exit faces thereof can be defined by $\theta_2 = 180° - 2\theta_1$.

In the following shown are the data of a design example embodying the present invention:

| | |
|---|---|
| First, second and third prisms | material BK7 |
| Lengths along the optical axis of first, second and third prisms | 12; 7.6; and 6.4 mm |
| Length of entrance face of first prism | 19 mm |
| Angle between entrance and junction faces of first prism | 27° |
| Angle between entrance and exit faces of first prism | 90° |
| Angle between entrance and junction faces of second prism | 15° |
| Angle between entrance and exit faces of third prism | 48° |
| Angle between non-reflected and first reflected optical axes | 54° |
| Angle between non-reflected and second reflected optical axes | 84° |
| F-number | 2 |
| Solid-state image pick-up element | 2/3" |

What I claim is:

1. A television camera, comprising:
   an objective lens;
   a first solid-state image pick-up element provided on the optical axis of said objective lens;
   a color separation optical system positioned between said objective lens and said first solid-state image pick-up element and comprising three prisms, wherein a first prism counted from the objective lens side comprises an entrance face, a junction face and a first exit face, a second prism comprises a first prism junction face, a third prism junction face and a second exit face, and a third prism comprises a junction face and a third exit face, said junction face of the first prism being adhered to said first prism junction face of the second prism through a first dichroic mirror while said third prism junction face of the second prism is adhered to said junction face of the third prism through a second dichroic mirror, whereby the light reflected by said first dichroic mirror is directly transmitted by said first exit face of the first prism while the light reflected by said second dichroic mirror is directly transmitted by said second exit face of the second prism, and the light transmitted by said second dichroic mirror is directly transmitted by said third exit face of the third prism, and said first and second dichroic mirrors are slanted in a same direction with respect to the optical axis of said objective lens;
   a second solid-state image pick-up element provided in facing relationship to said second exit face of the color separation optical system; and
   a third solid-state image pick-up element provided in facing relationship to said third exit face of the color separation optical system.

2. A television camera according to the claim 1, wherein the angle $\theta 1$ of said first prism between the entrance and junction faces thereof is defined by $0 < \theta 1 < 35°$ and the angle $\theta 2$ of said first prism between the entrance and exit faces thereof is defined by $\theta 2 = 180° - 2\theta 1$.

3. A television camera comprising:

an objective lens;

a first solid-state image pick-up element provided on the optical axis of said objective lens;

first and second dichroic elements provided between said objective lens and said first solid-state image pick-up element, said first and second dichroic elements being slanted in the same direction with respect to the optical axis of said objective lens;

a second solid-state image pick-up element to which the light reflected from said first dichroic element is directly guided; and a third solid-state image pick-up element to which the light reflected from said second dichroic element is directly guided.

* * * * *